Patented July 19, 1932

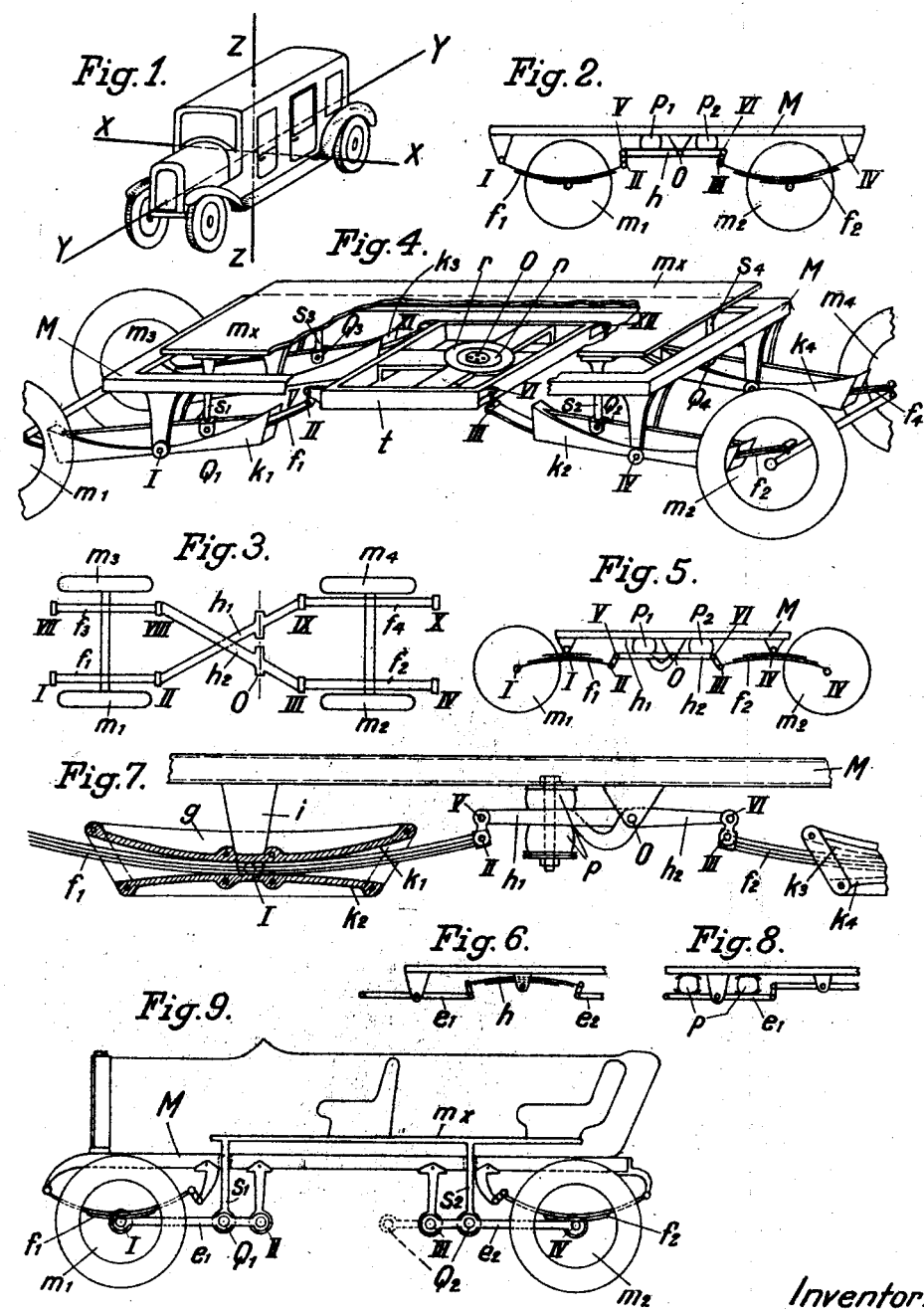

1,868,258

UNITED STATES PATENT OFFICE

GEORG HEINRICH SCHIEFERSTEIN, OF BERLIN-CHARLOTTENBURG, GERMANY

METHOD OF AND MEANS FOR SUSPENSION OF VEHICLES

Application filed October 24, 1927, Serial No. 228,409, and in Germany October 29, 1926.

This invention relates to spring suspension for vehicles.

In order to facilitate comprehension of the invention the same will be described with reference to the accompanying drawing, in which—

Figure 1 is an explanatory diagram with relation to co-ordinate axes through its centre of gravity.

Fig. 2 shows one form of vehicle suspension.

Fig. 3 shows another form.

Fig. 4 is a perspective view of a suspension using a frame having universal movement.

Fig. 5 shows a different relation of springs.

Figs. 6, 7 and 8 show different spring arrangements.

Fig. 9 illustrates a motor vehicle showing an auxiliary useful load-carrying platform.

Assuming that there be drawn through the centre of gravity of a vehicle as illustrated in Fig. 1, a horizontal axis X, a second horizontal axis Y and a vertical axis Z, all the movements of oscillation to which the said vehicle is subjected can be referred to such a system of coordinates.

A very decided oscillatory structure results when the said vehicle is fitted with springs, and with pneumatic or other rubber tires which act as an exciting coupling on the masses moved.

The science of oscillations teaches that all oscillations occuring in such systems can be referred to six fundamental forms. Of these six forms, three occur as oscillations about the three mutually perpendicular axes, and three parallel thereto. The most dangerous form of oscillations for the vehicle is that about the axis X, which by analogy with the oscillations of a ship, may be termed pitching, while the oscillations about the axis Y may be termed rolling. Finally, it is possible to image an oscillation about the axis Z, which is known as wobbling.

There therefore remain three types of oscillation in vehicles, and the function of a suspension is to minimize these types of oscillation as uniformly as possible, so as to reduce their influence on the useful load to its lowest terms. Nevertheless, it cannot be considered that a solution of the problem has been obtained if only one or another of the possible oscillations has been eliminated while the total disturbing energy in passing over an obstacle is so applied as to set up a remaining third oscillation in a correspondingly greater degree.

Thus, for example, it has frequently been proposed, in order to eliminate the pitching oscillations about the axis X, to connect the two springs $f'$ and $f^2$ together by a lever V, O, VI (Fig. 2) which is maintained in equilibrium by the rectifying force of the elastic spring means $p'$, $p^2$ to exert a balancing action between the two springs. This interpretation is quite correct in the case of a two-wheeled vehicle, as is shown diagrammatically in Fig. 2. If, on the other hand, the same arrangement be employed at both sides of a four-wheeled vehicle, the oscillations about the axis Y are not only entirely unaffected by the device, but may even become intensified. In order to counteract this, it has been proposed to provide the same arrangement also in the transverse direction of the vehicle, that is, place a balancing lever across the front and rear ends of the vehicle. Closer investigation, however, shows that any disturbance set up in one wheel in passing over an obstacle initiates a movement in the same direction in the two adjoining wheels, and a movement in the opposite direction in the diagonally opposite wheel, so that the vehicle is caused to oscillate in a very powerful manner about the diagonal connecting wheels adjacent to the one under consideration. Hence, the purpose in view cannot be accomplished in this manner, the effect being merely diverted into another direction.

The present invention is based on the new discovery that, in order to effect a real improvement in the spring suspension of vehicles, each effort which is exerted on an elastic member or spring in overcoming an obstacle must be decomposed into an even number of mutually opposed torques.

This condition is approximately fulfilled by a device such as illustrated in Fig. 3, where $f'$—$f^4$ denote the springs, which are attached to the axles in the usual way; and $h$ and $h'$ are balancing levers connecting the ends of the near front spring with the off rear spring, and the off front spring with the near rear spring, in a crosswise manner. If, for example, the wheel $m^2$ passes over an obstacle, the tension of the spring $f^2$ is increased, with a corresponding pressure at the points III and IV, and the lever $h^2$ turns on the pivotal axis O in such a way that the point VIII is depressed thereby to increase the tension of the spring $f^3$ and raise the point VII. The increased pressure set up at the point IV in passing over an obstacle therefore generates a left hand torque about the axix X and a right hand torque about the axis Y of the vehicle; while the increased pressure at the point VII sets up a right-hand torque about the axis X and a left hand torque about the axis Y. That is to say, in the case of four-wheeled vehicles, the balance in the diagonal direction must be effected by means of crossed levers if both pivotal oscillations are to be suitably reduced or eliminated.

All that remains therefore to be investigated is how the oscillation parallel to the axis X behaves in this case. As a rule, the mass M, or chassis frame which is connected with the mass $m$ of the axle wheels by means of springs, moves, on the occurrence of oscillations, through a distance S the ratio of which to that $s$ of the small mass is in inverse ratio to the masses themselves.

Taking the case, therefore, of a four-wheeled vehicle in which the wheel pressure is equally distributed, then, if the wheel or mass $m^2$ be raised a distance $s$, it may be taken for granted that the frame will be moved by $$S = \frac{s \cdot m}{\frac{M}{4}};$$

whereas, in the present case, since the whole weight of the frame M will have to be lifted, this will be moved a distance $$S = \frac{s \cdot m}{M};$$

therefore the parallel oscillation will also be reduced to one fourth of its original value.

The conditions are still clearer when, as shown in Fig. 4, the two crossed levers $h$ and $h'$ of Fig. 3 are replaced by a swashplate frame $t$, adapted to reel about the point O. Since each of the springs $f'$, $f^2$, $f^3$, $f^4$ is articulated at one of the corners V, VI, XI and XII of the frame $t$, said frame exerts a balancing action between these four points of attachment, inasmuch as it moves in any case in the line or lines of least resistance until a state of equilibrium is attained. Such a frame may be regarded as a kind of balancing beam, tending to restore equilibrium in all four directions.

Hence, in the arrangement described with reference to Fig. 4, any right-hand torque set up at any point is opposed by a corresponding left-hand torque, so that the occurrence of oscillations is nearly or completely eliminated, according to the degree of damping in question. Moreover, the parallel oscillations coming into question here are reduced to about one-fourth, as already shown above in relation to Figure 3.

Oscillations of vehicles about the axis Z may be obviated according to my invention by interposing a member adapted to equalize oscillations about this axis between the masses of the two axles (including the wheels) and the mass of the chassis, or by employing a swashplate-type of member adapted to move in relation to all three axes.

The springs employed in the arrangement described may obviously be of many different kinds. Thus, as shown in Fig. 5, freely mounted springs $f'$ and $f^2$, acting as levers, may be used. The springs $f'$ and $f^2$ may also be replaced by rigid levers $e'$ and $e^2$, (Fig. 6) these being connected in turn to flexible balancing members $h$. It is also feasible, as illustrated in Fig. 7, to employ springs which do not operate in harmony, i. e., such as move in contact with rigid curves $k'$ and $k^2$, and incorporate simultaneously the properties of an elastic medium and rigid lever, without departing from the nature of the present invention.

Fig. 8 illustrates a typical embodiment for the known application of rubber pads $p$ as the elastic medium, or of pneumatic rubber bodies. Said bodies are also mounted between the frame and rigid levers $e_1$, which in turn can be mutually balanced, as described with reference to Figs. 2 to 7.

The herein described arrangements which must be regarded throughout as oscillatory units, also enable the whole problem to be considered from still more general standpoints, as will hereinafter be explained.

Each mechanical system adapted to oscillate contains at least one natural node in which the tension is nil, and at least one in which the velocity is nil. This last point, or velocity node, acquires special importance in cases where one point in the system is to be kept at rest even when all the other points are oscillating.

A very complete solution of the suspension problem is obtained, therefore, when the natural oscillation nodes are sought for in devices of the kind described and in which the amplitude of oscillation has already been reduced to a minimum; or such nodes are provided by constructional means; and the useful load to be carried is connected at such nodes.

It is, therefore, practicable to have an artificial nodal point between two oscillating spring-connected masses, such as the frame of a motor car and a corresponding road wheel of such car; or to ascertain, by theoretical or empirical means, the presence of any such point in the moved members of the system concerned.

Fig. 9 represents a motor car in which levers $e'$—$e^2$ ($e^3$—$e^4$) are articulated at one end to or near to the four stub axles, the other end of the levers being articulated to the car frame M. If now the mass $m^2$ and the mass M, for example, oscillate at a relative phase angle of about 180°, a stationary point, which does not share the motion, is established at $Q^2$ for the lever $e^2$, said point being the oscillation node which is sought. In this case the relative behavior of the two arms of the lever $e^2$ is in inverse ratio to the two masses. Hence, when the character of the movements in question—that is, the nature of the coupling—and especially the phase displacement, is known, the position of the nodal point can be determined in advance by weighing the masses concerned. It is also feasible to ascertain by empirical means, such as the taking of motion pictures of the moving vehicle, which point of the member concerned remains at rest in passing over obstacles, and shall be regarded as the nodal point.

If the masses M and $m^2$ connected by elastic means oscillate with a phase angle which does not differ excessively from 0°, then, as indicated by the dotted lines in Fig. 9, the nodal point $Q^2$ lies at a point beyond the lever $e^2$, but if they oscillate with a phase angle approaching 180°, the oscillation node $Q^2$ lies between the two articulation points III and IV. This applies, of course, to all four wheels.

If stays $s'$—$s^4$ Fig. 9, be attached at the nodal point $Q'$—$Q^4$ and a platform $m_x$ be mounted on said stays, this platform (which remains at rest when oscillations occur, even when the useful load varies within wide limits) can be employed for non-vibratory transport. The platform $m_x$ may obviously also be mounted by means of any other levers already present in the suspension mechanism, such as the levers $e'$ and $e^2$ of Fig. 6, or the rigid lever-like curves $k'$ and $k^2$ of Fig. 7, since in any event when oscillations occur, a nodal point must be formed, in an oscillating lever forming part of the suspending system concerned, or in an extension of the same.

The interaction of all the factors affecting the suspension can be gathered from Fig. 4. M is the actual frame of the vehicle, the corners of which are provided with bearing brackets, the pivotal points of which, I, IV, VII and X are articulated to the rigid curved girders $k'$—$k^4$, together with the springs $f'$—$f^4$. One end of each spring is attached to the axle by a universal joint and the other end to a frame $t$ by similar means. The frame $t$ is adapted to reel about the point of support O, which, as before stated, is at or near the centre of gravity of the car on the chassis frame. Consequently there is provided at this point and secured on the frame M, either a universal joint or a ball bearing, or, as shown in the present instance, a diaphragm $n$, which is clamped between the ring $r$ and the central mounting O, and may consist of a plurality of flexible layers. The stays $s'$—$s^4$ carrying the platform $m_x$, are attached to the nodal points $Q'$—$Q^4$, ascertained by experiment or estimation.

If now any of the wheels, with the mass, passes over an obstacle, such as a depression or bump on the ground, a disturbance of equilibrium is set up in the frame $t$ before the inert mass M is able to come into action, and, as shown, opposes the factors producing oscillation, without, however, being able to entirely prevent a slight (considered as a percentage) rise or fall of the frame M. However, each descent of the frame is accompanied by a corresponding rise of the platform $m_x$, and conversely, each ascent of the frame M is accompanied by a descent of the platform $m_x$, as can be seen from the drawing; that is to say, the platform $m_x$ is attached at just those points, the nodal points, which do not share any movement of the masses $m'$—$m^4$ or M, so that, if the nodal points $Q'$—$Q^4$ have been suitably selected, the mass $m_x$ remains motionless within certain limits, although all other members of the vehicle describe more or less extensive oscillations.

It will thus be seen that the rectangular frame $t$ not only transmits movement from wheel $m'$ to spring of wheel $m^2$ but also diagonally as in Fig. 3, to the spring of wheel $m^4$ while the movement of the spring of wheel $m^4$ is also transmitted diagonally to the spring of wheel $m^2$. Also the movement of one side of this frame at the side of the car is transmitted to the other side of the frame, so that the wabbling of the frame $t$ about its centre will transmit spring oscillation from one spring to the others, and this transmission will enable the other springs to counteract or balance the oscillations of the one spring $m'$ in question.

I claim:

1. A spring suspension for vehicles, comprising a vehicle frame, springs on the frame on which the axles are mounted, means connected to the springs to transmit the movements of one axle to the other and produce oppositely acting pairs of forces mutually compensating one another, and means for carrying live loads movable independently of the main frame and mounted at nodal points of the aforesaid combination, whereby said live load carrying means remains approximately stationary.

2. A spring suspension for vehicles, comprising vehicle axles, vehicle springs to which said axles are connected, means to support the springs on the vehicle, means arranged between the axles and to which the springs are connected to transmit vertical movements of each wheel to all the other wheels in compensating moments, and live load carrying means carried by the spring supporting means at the nodal points thereof.

3. A spring suspension for vehicles comprising a chassis frame, front and rear axles, rigid devices restricting the free oscillations of the springs and pivotally connected to the frame, vehicle springs mounted in said devices, vehicle axes connected to the one ends of said springs, a universally movable frame pivoted to the frame and to which the other ends of the springs are connected, an auxiliary live load carrying device and means connecting the live load carrying device to the nodal points of the spring restraining devices.

4. A spring suspension for vehicles, said suspension comprising a vehicle frame, axles adjacent the ends of said frame and beneath the frame, downwardly extending arms carried by the frame, spring receiving sleeves carried by the downwardly extending arms, said sleeves having chambers extending longitudinally therethrough and flaring from their centers to their ends, longitudinally disposed springs in said sleeves and snubbed by the sleeve ends, a frame universally connected to the vehicle frame, adjacent ends of said springs being universally connected to said frame connected to the vehicle frame, said last named frame and spring forming means whereby movements of one axle will be transmitted to the other axle and compensated.

5. A spring suspension for vehicles comprising vehicle axles, vehicle springs to which said axles are connected, means to support the springs on the vehicle, said last named means having spring snubbing means directly in connection therewith, means arranged between the axles and to which the springs are connected to transmit vertical movements of each wheel to all the other wheels in compensating movements and live load carrying means carried by the spring supporting means at the nodal points thereof.

In testimony whereof I affix my signature.

GEORG HEINRICH SCHIEFERSTEIN.